United States Patent
Hwang et al.

(12)

(10) Patent No.: US 9,800,064 B2
(45) Date of Patent: Oct. 24, 2017

(54) BATTERY CHARGE AND DISCHARGE CONTROL SYSTEM AND BATTERY CHARGE AND DISCHARGE CONTROL METHOD

(71) Applicant: SAMSUNG SDI CO., LTD., Yongin-si, Gyeonggi-do (KR)

(72) Inventors: Doosun Hwang, Yongin-si (KR); Hyeonseok Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 109 days.

(21) Appl. No.: 14/840,295

(22) Filed: Aug. 31, 2015

(65) Prior Publication Data

US 2016/0226269 A1   Aug. 4, 2016

(30) Foreign Application Priority Data

Jan. 30, 2015   (KR) .................. 10-2015-0015594

(51) Int. Cl.
*H02J 7/00* (2006.01)
*B60L 3/00* (2006.01)
*B60L 11/18* (2006.01)
*H02J 7/34* (2006.01)

(52) U.S. Cl.
CPC .......... *H02J 7/0021* (2013.01); *B60L 3/0046* (2013.01); *B60L 11/1859* (2013.01);
(Continued)

(58) Field of Classification Search
CPC ......... H02J 7/0021; H02J 7/007; H02J 7/0022
USPC .......................................... 320/129
See application file for complete search history.

(56) References Cited

U.S. PATENT DOCUMENTS 6,232,744 B1 * 5/2001 Kawai .................. B60K 6/28
  180/65.235
7,508,170 B2 * 3/2009 Iida et al. ............ H02J 7/0029
  320/134

(Continued)

FOREIGN PATENT DOCUMENTS

EP   2 838 176 A1   2/2015
JP   2014-147197 A   8/2014

(Continued)

OTHER PUBLICATIONS

Extended European Search Report dated May 31, 2016 in Corresponding European Patent Application No. 16153361.7.

*Primary Examiner* — Sun Lin
(74) *Attorney, Agent, or Firm* — Lee & Morse, P.C.

(57) ABSTRACT

A control system includes a state-of-charge (SOC) measuring unit and a controller. The SOC measuring unit measures a SOC of a first battery pack and a SOC of a second battery pack. The controller adjusts the SOC of the first battery pack and the SOC of the second battery pack. When a difference between the SOC of the first battery pack and the SOC of the second battery pack is less than a first threshold value, the controller performs an adjustment to adjust the SOC of the first battery pack and the SOC of the second battery pack so that said difference becomes equal to the first threshold value. An average of the SOC of the first battery pack and the SOC of the second battery pack before the adjustment is equal to an average of the SOC of the first battery pack and the SOC of the second battery pack after the adjustment. The controller pulse-charges or pulse-discharges the first battery pack and the second battery pack using a first C-rate.

20 Claims, 13 Drawing Sheets

(52) U.S. Cl.
CPC ....... *B60L 11/1862* (2013.01); *B60L 11/1864* (2013.01); *H02J 7/007* (2013.01); *H02J 7/0013* (2013.01); *H02J 7/0022* (2013.01); *H02J 7/0054* (2013.01); *B60L 2240/545* (2013.01); *B60L 2240/547* (2013.01); *B60L 2240/549* (2013.01); *H02J 7/0014* (2013.01); *H02J 7/34* (2013.01); *Y02T 10/7005* (2013.01); *Y02T 10/7044* (2013.01); *Y02T 10/7061* (2013.01)

(56) References Cited

U.S. PATENT DOCUMENTS

| | | | | |
|---|---|---|---|---|
| 7,629,770 | B2 * | 12/2009 | Iida et al. | B60L 11/1868 320/134 |
| 7,888,911 | B2 * | 2/2011 | Wong et al. | B60L 11/185 320/132 |
| 8,049,465 | B2 * | 11/2011 | Barsoukov et al. | G01R 31/3606 320/132 |
| 9,506,990 | B2 * | 11/2016 | Stewart et al. | G01R 31/025 |
| 2012/0091930 | A1 | 4/2012 | Takahashi et al. | |

FOREIGN PATENT DOCUMENTS

| | | |
|---|---|---|
| KR | 10-2005-0021409 A | 3/2005 |
| KR | 10-2008-0011833 A | 2/2008 |
| KR | 10-2009-0014898 A | 2/2009 |
| KR | 10-2013-0137560 A | 12/2013 |
| KR | 10-2014-0144475 A | 12/2014 |

\* cited by examiner

FIG. 5B

| LIFETIME PREDICTION BY C-RATES[%] | 0.1 | 0.2 | 0.3 | 0.4 | 0.5 | 0.6 | 0.7 | 0.8 | 0.9 | 1.0 | 2.0 | 3.0 |
|---|---|---|---|---|---|---|---|---|---|---|---|---|
| | 60.5% | 70.4% | 74% | 75.9% | 77.1% | 77.9% | 78.4% | 78.9% | 79.2% | 79.5% | 79.1% | 79% |

BATTERY CHARGE AND DISCHARGE CONTROL SYSTEM AND BATTERY CHARGE AND DISCHARGE CONTROL METHOD

CROSS-REFERENCE TO RELATED APPLICATION

Korean Patent Application No. 10-2015-0015594, filed on Jan. 30, 2015, and entitled, "Battery Charge and Discharge Control System and Battery Charge and Discharge Control Method," is incorporated by reference herein in its entirety.

BACKGROUND

1. Field

One or more embodiments described herein relate to a battery charge and discharge control system and a battery charge and discharge control method.

2. Description of the Related Art

A mobile device may operate based on power from a rechargeable battery pack.

In order to extend the time of use of the mobile device, the battery pack may be frequently charged. Another approach involves using two battery packs to power one mobile device. The two battery packs may have the same size and chemical properties.

Each battery pack may have a control circuit and a fuel gauge circuit or a microcomputer. The fuel gauge circuit or microprocessor calculate the capacity of the battery pack. However, these circuits increase the price of the battery pack. In addition, two battery packs used for one device may have the same shape, chemical properties, the capacity, and charge voltage or charge current. This increases size and lowers energy efficiency per volume.

Generally, a battery may experience less deterioration when not in use and may experience greater deterioration when in use. In order to slow deterioration, the battery may be used at a low rate rather than a high rate. In a further attempt to slow deterioration, the battery may only be used when in a better state of charge (SOC) state.

When an energy storage system or battery system, including battery packs connected in series or parallel, is charged or discharged, all battery packs connected in parallel operate. Thus, when batteries are in a rest state or are used for a long time in an SOC region in which deterioration characteristics of the batteries are not relatively good, the lifetimes of the batteries may be reduced.

SUMMARY

In accordance with one or more embodiments,

BRIEF DESCRIPTION OF THE DRAWINGS

Features will become apparent to those of skill in the art by describing in detail exemplary embodiments with reference to the attached drawings in which:

FIGS. 5A and 5B illustrate examples of a remaining capacity of a battery pack according to a C-rate;

DETAILED DESCRIPTION

Figure 1:
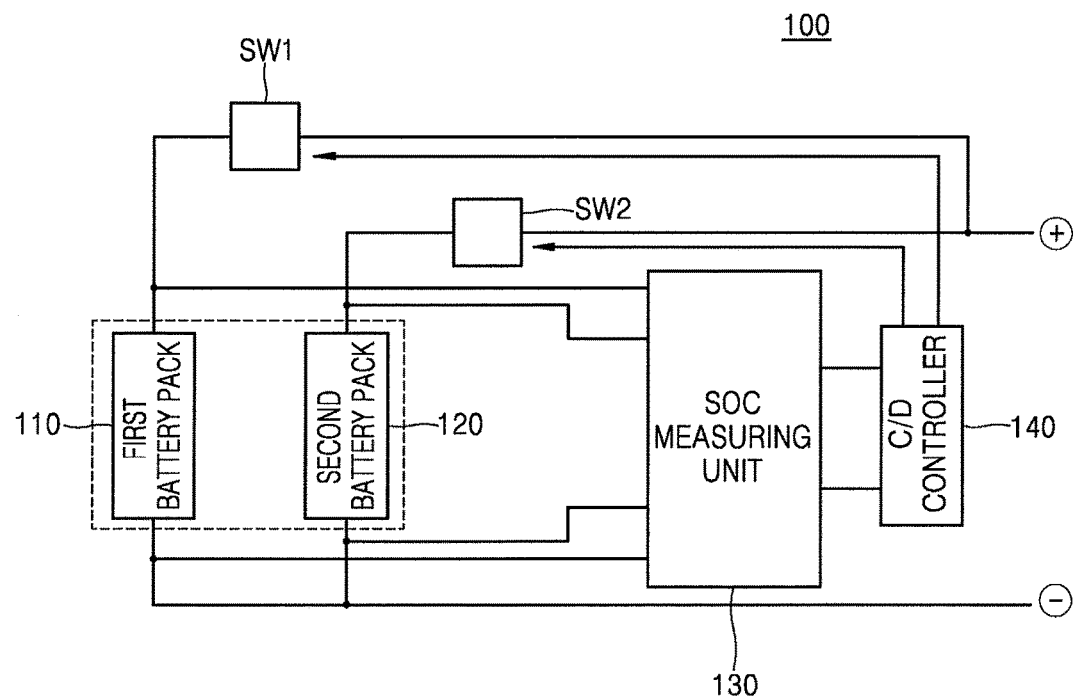
FIG. 1 illustrates an embodiment of a battery charge and discharge control system.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments. Like reference numerals refer to like elements throughout.

FIG. 1 illustrates an embodiment of a battery charge and discharge control system 100 which includes a first battery pack 110, a second battery pack 120, a state-of-charge (SOC) measuring unit 130, and a charge and discharge controller 140. The first battery pack 110 and the second battery pack 120 are connected in parallel. In FIG. 1, two battery packs 110 and 120 are illustrated. In another embodiment, three or more battery packs may be connected in parallel, for example, depending on system requirements to increase capacity. Also, a plurality of battery groups including a plurality of battery packs connected in series may be connected in parallel to increase capacity and an output voltage.

The SOC measuring unit 130 is connected to the first battery pack 110 and the second battery pack 120 to measure charge states of the first and second battery packs 110 and 120. When a difference between an SOC of the first battery pack 110 and an SOC of the second battery pack 120 is less than a first threshold value, the charge and discharge controller 140 adjusts the SOCs of the first and second battery packs 110 and 120. The adjustment involves setting the difference between the SOC of the first battery pack 110 and the SOC of the second battery pack 120 equal to the first threshold value. Also, an average of the SOCs of the first and second battery packs 110 and 120 before the adjusting are set equal to an average of the SOCs of the first and second battery packs 110 and 120 after the adjustment.

For example, when the SOC of the first battery pack 110 is 45%, the SOC of the second battery pack is 55%, and the first threshold value is set to 20%, the charge and discharge controller 140 may adjust the SOCs of the first and second battery packs 110 and 120 so that the SOC of the first battery pack 110 is 40% and the SOC of the second battery pack 120 is 60%.

Adjusting the SOCs of the first and second battery packs 110 and 120 so that the difference between the SOC of the first battery pack 110 and the SOC of the second battery pack 120 becomes 20% is only one example. The difference may correspond to a different value in another embodiment. In addition, if the SOC of the first battery pack 110 and the SOC of the second battery pack 120 are each 50% before the adjustment, the SOC of one of the first or second battery packs 110 and 120 may be adjusted to be 40% and the SOC of the other may be adjusted to be 60%.

The charge and discharge controller 140 adjusts the SOCs of the first and second battery packs 110 and 120 so that the sum of a difference between the SOC of the first battery pack 110 after the adjustment and a first reference value and a difference between the SOC of the second battery pack 120 after the adjustment and the first reference value is a predetermined value, e.g., is maximized. In this case, the first reference value may be an SOC value for reducing or minimizing lifetimes of the first and second battery packs 110 and 120.

The lifetime of a battery pack may vary depending on the SOC of the battery pack. An SOC which increases or maximizes lifetime may vary, for example, depending on the type of battery packs. Although an SOC of a battery pack has a certain value, the SOC may decrease or increase by a certain percentage according to use of the battery pack. In this case, the SOC of the battery pack may be adjusted so that the battery pack operates in an SOC section where the battery pack has relatively better lifetime characteristics. In one embodiment, the battery pack may not be used in an SOC section that is disadvantageous to the lifetime characteristics of the battery pack, even if the SOC decreases or increases, by taking into account the amount of increase or decrease of the SOC.

In the example described above, if it is most disadvantageous to use a battery pack having an SOC of 50% due to its lifetime characteristics, the SOC of the first battery pack 110 and the SOC of the second battery pack 120 may be adjusted to be different from 50% in order to increase the lifetimes of the first and second battery packs 110 and 112. For example, since the first threshold value is set to 20% in the example described above, the SOC of the first battery pack 110 and the SOC of the second battery pack 120 may be adjusted to be 40% and 60%, respectively, in order to increase the lifetimes of the first and second battery packs 110 and 112. If the first threshold value is set to 30%, instead of 20%, the SOC of the first battery pack 110 and the SOC of the second battery pack 120 may be adjusted to be 35% and 65%, respectively.

When a difference between an SOC of the first battery pack 110 and an SOC of the second battery pack 120 is less than a first threshold value, the charge and discharge controller 140 adjusts the SOCs of the first and second battery packs 110 and 120 so that the difference between the SOC of the first battery pack 110 and the SOC of the second battery pack 120 becomes equal to the first threshold value and an average of the SOCs of the first and second battery packs 110 and 120 before the adjusting becomes equal to an average of the SOCs of the first and second battery packs 110 and 120 after the adjusting.

When a difference between the SOC of the first battery pack 110 and the SOC of the second battery pack 120 is greater than a second threshold value, the charge and discharge controller 140 may charge or discharge the first and second battery packs 110 and 120 so that the difference between the SOC of the first battery pack 110 and the SOC of the second battery pack 120 is less than or equal to the second threshold value.

For example, when the second threshold value is set to 40%, the SOC of the first battery pack 110 is 75%, and the SOC of the second battery pack 120 is 30%, the charge and discharge controller 140 may adjust the SOCs of the first and second battery packs 110 and 120 so that the difference between the SOC of the first battery pack 110 and the SOC of the second battery pack 120 is less than or equal to 40%.

After the adjustment, the SOC of the first battery pack 110 and the SOC of the second battery pack 120 may be 72.5% and 32.5%, respectively. Accordingly, an average of the SOCs of the first and second battery packs 110 and 120 before the adjustment may be equal to an average of the SOCs of the first and second battery packs 110 and 120 after the adjustment.

The charge and discharge controller 140 may charge or discharge, with a first C-rate, the first battery pack 110 and the second battery pack 120 after adjusting the SOCs of the first and second battery packs 120 using the method described above. In at least one embodiment, C-rate corresponds to a current rate and is a unit for setting a current value under various using conditions during charging and discharging of a battery and for estimating or denoting an available using time of the battery. A current value according to a charge and discharge rate may be calculated by dividing a charge or discharge current by the rated capacity of the battery. The term "C" is used as the unit of the C-rate.

The value of the first C-rate of a charge or discharge current used by the charge and discharge controller 140 to charge or discharge a battery pack may be set based on a C-rate value which increases or maximizes the lifetimes of the first and second battery packs 110 and 120.

In one embodiment, the battery charge and discharge control system 100 sets a C-rate value to be used when charging and discharging a battery pack, based on a C-rate value by which the lifetime of the battery pack is increased or maximized. Even if a high current is applied through a pulse charge and discharge, rather than a continuous charge and discharge, deterioration of a battery may be suppressed and the lifetime of the battery may be lengthened.

The battery charge and discharge control system 100 may include a first switch SW1 and a second switch SW2. The first switch SW1 is turned on or turned off based on a first control signal from the charge and discharge controller 140 to charge or discharge the first battery pack 110. The second switch SW2 is turned on or turned off based on a second control signal from the charge and discharge controller 140 to charge or discharge the second battery pack 120.

When the difference between the SOC of the first battery pack 110 and the SOC of the second battery pack 120 is greater than a second threshold value, the charge and discharge controller 140 may charge or discharge the first and second battery packs 110 and 120 so that the difference between the SOC of the first battery pack 110 and the SOC of the second battery pack 120 is equal to the second threshold value.

The second threshold value may be a value not less than the first threshold value and, for example, may be equal to the first threshold value. The battery charge and discharge control system 100 sets an appropriate SOC difference between a plurality of battery packs and adjusts an SOC difference between or among the battery packs to the set SOC difference when the SOC difference between the battery packs, measured by the SOC measuring unit 130, is different from the set SOC difference.

The first threshold value may be a reference value for increasing an SOC difference between battery packs having a small SOC difference therebetween. The second threshold value may be a reference value for reducing an SOC difference between battery packs having a large SOC difference therebetween.

Each of the first and second threshold values may include an offset. When both the first threshold value and the second threshold value are 40% and have an offset of 2%, an operation for adjusting SOCs of battery packs may not be performed when an SOC difference between the battery packs is equal to or greater than 38% and is equal to or less than 42%. When the SOC difference between the battery packs is less than 38%, the SOC difference may be increased so that the SOC difference between the battery packs is 40%. In addition, when the SOC difference between the battery packs is greater than 42%, the SOC difference may be reduced so that the SOC difference between the battery packs is 40%.

When the SOCs of the first and second battery packs 110 and 120 are equal to or less than 10% or equal to or greater than 90% before adjusting the SOCs thereof, the charge and discharge controller 140 may not adjust the SOCs of the first and second battery packs 110 and 120. Accordingly, even if an SOC difference between the first battery pack 110 and the second battery pack 120 is equal to or less than the first threshold value or is equal to or greater than the second threshold value, the charge and discharge controller 140 does not adjust the SOCs of the first and second battery packs 110 and 120 when the SOC of any one of the first and second battery packs 110 and 120 is equal to or less than 10% or is equal to or greater than 90%.

Figure 2A:
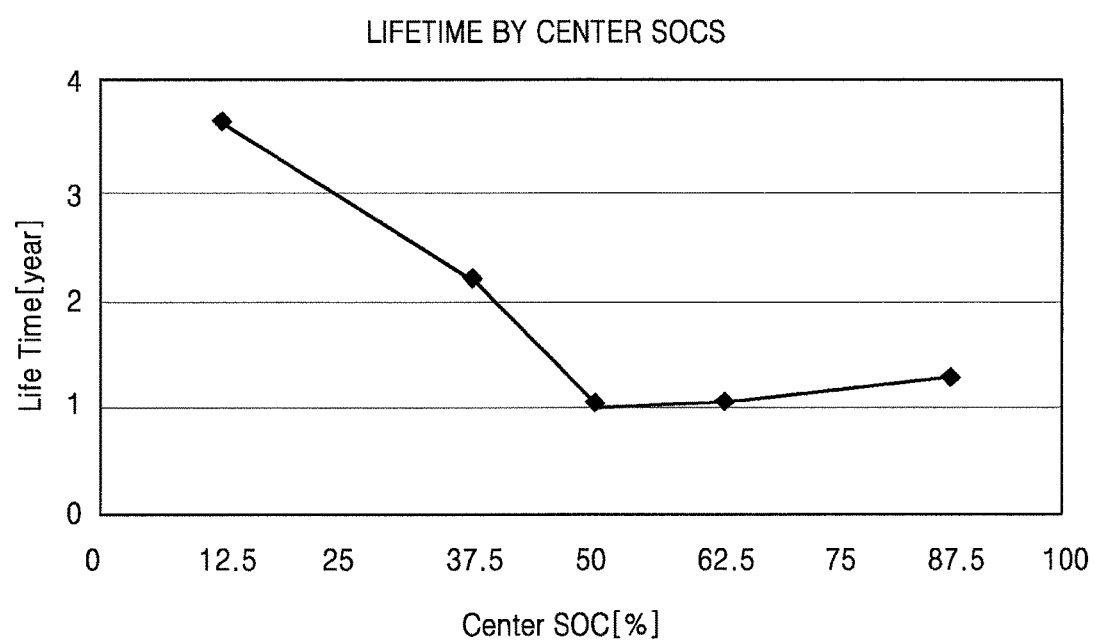
FIGS. 2A and 2B illustrate examples of the lifetime of a battery according to SOC.
Figure 2B:
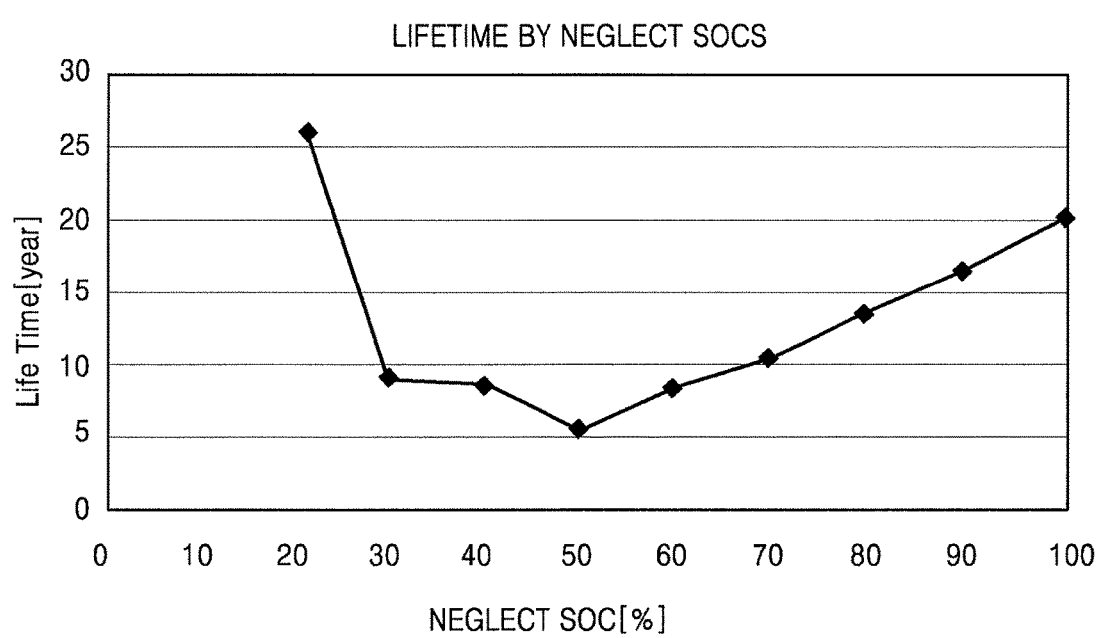

FIGS. 2A and 2B are graphs illustrating examples of the lifetime of a battery according to SOC. FIG. 2A illustrates the lifetime of a battery according to a center SOC, e.g., a medium value between an SOC in a full charge state and an SOC in a full discharge state. In the example of FIG. 2A, the lifetime of a battery is shown when, based on the center SOC, a state where the SOC is −12.5% is set as the full discharge state and a state where the SOC is +12.5% is set as the full charge state.

Referring to FIG. 2A, the lifetime of the battery is shortest when the center SOC is set to 50% and the SOC is in a range between 37.5% and 62.5%. The lifetime of the battery is increased when the battery is used in a section where the SOC is less than 50%, and the lifetime of the battery is also increased when the battery is used in a section where the SOC is greater than 50%. Accordingly, in the case of a battery having SOC-lifetime characteristics as in FIG. 2A, a relatively long lifetime may be secured when the battery is used in a section where the SOC is not 50%.

FIG. 2B is a graph illustrating an example of the lifetime of a battery according to a non-use SOC. The non-use SOC may correspond to an SOC of the battery when the battery is not being charged or discharged, e.g., in a state where the battery is not being used. Referring to FIG. 2B, the lifetime of the battery is shortest when the non-use SOC is 50%. Accordingly, in the case of a battery having SOC-lifetime characteristics as in FIG. 2B, a relatively long lifetime may be secured when the battery is left in a section where the SOC is not 50%.

The two graphs of FIGS. 2A and 2B illustrate results measured with respect to a battery of a certain type, and the SOC-lifetime characteristics in FIGS. 2A and 2B are just examples. Different measurements or characteristics may obtain for other embodiments.

The SOC-lifetime characteristics of a battery may be obtained, for example, through repeated measurements based on the type of the battery. In one embodiment, an SOC section may be set in which the battery is not to be used according to measured results, and use the battery may be used in a section other than the set section to secure a relatively long lifetime.

Figure 3A:
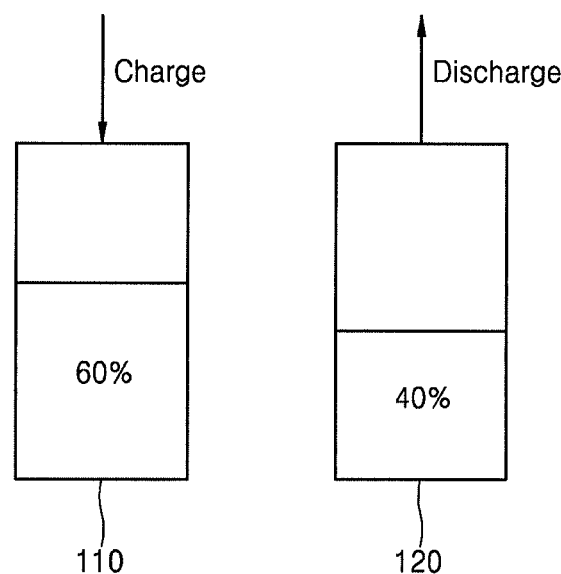
FIGS. 3A and 3B illustrate examples relating to a method for adjusting SOC of a battery pack.
Figure 3B:
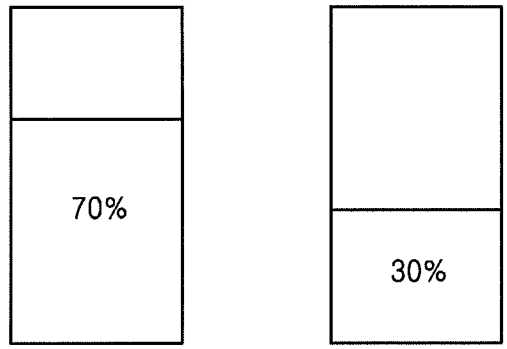

FIGS. 3A and 3B illustrate examples of operations of one embodiment of a method for adjusting the SOC of a battery pack. The first battery pack 110 and a second battery pack 120 are illustrated in FIGS. 3A and 3B. Here, it is assumed that the first battery pack 110 and the second battery pack 120 are connected in parallel.

FIG. 3A illustrates states of the first and second battery packs 110 and 120 before SOCs of the first and second battery packs 110 and 120 are adjusted. FIG. 3B illustrates states of the first and second battery packs 110 and 120 after the SOCs of the first and second battery packs 110 and 120 are adjusted. In FIGS. 3A and 3B, a case, in which a first threshold value is set to 30% and a first reference value (e.g., an SOC by which lifetimes of the first and second battery packs 110 are minimized) is 50%, is described as an example.

Referring to FIG. 3A, the SOC of the first battery pack 110 and the SOC of the second battery pack 120 are 60% and 40%, respectively, before the SOCs of the first and second battery packs 110 and 120 are adjusted. Referring to FIG. 3B, the SOC of the first battery pack 110 and the SOC of the second battery pack 120 are 70% and 30%, respectively, after the SOCs of the first and second battery packs 110 and 120 are adjusted.

Since an SOC difference between the first battery pack 110 and the second battery pack 120 is 20% and is less than the first threshold value of 30%, the charge and discharge controller 140 adjusts the SOCs of the first and second battery packs 110 and 120 so that the SOC difference between the first battery pack 110 and the second battery pack 120 is 30%. In this case, the SOCs of the first and second battery packs 110 and 120 may be adjusted so that an average of the SOCs before the adjustment of the SOCs is equal to an average of the SOCs after the adjustment of the SOCs. In this case, the charge and discharge controller 140 adjusts the SOCs of the first and second battery packs 110 and 120 so that the SOC of the first battery pack 110 is 70% after charging the first battery pack 110 and the SOC of the second battery pack 120 is 30% after discharging the second battery pack 120

As another example, when SOCs of two battery packs (e.g., the first and second battery packs 110 and 120) are 45% and 60%, respectively, before adjusting the SOCs, the first threshold value is 30%, and the first reference value is 40%, the charge and discharge controller 140 may adjusts the SOCs of the first and second battery packs 110 and 120 so that the SOC of the first battery pack 110 and the SOC of the second battery pack 120 are 37.5% and 67.5%, respectively. In this case, the SOC of the first battery pack 110, which was 45% before the adjusting of the SOCs, becomes 37.5% after the adjusting of the SOC and thus becomes closer to the first reference value. As the SOC of the first battery pack 110 is closer to the first reference value, the lifetime of the first battery pack 110 may be reduced. Thus, the first threshold value may be set to a relatively large value to prevent reduction of the lifetime of the first battery pack 110. When the first threshold value is set to 40%, the SOCs of the first and second battery packs 110 and 120 may be adjusted to 32.5% and 72.5%, respectively, so that the SOCs of the first and second battery packs 110 and 120 are more distant from the first reference value.

The first reference value is a value that varies according to characteristics of a battery and may be obtained by repeated experiments and measurements. Thus, a method of flexibly adjusting the first threshold value according to the first reference value and an SOC of the battery pack before adjusting the SOC may also be used.

In the foregoing embodiment, the battery charge and discharge control system 100 has been described for two battery packs. In another embodiment, the battery charge and discharge control system 100 may control three or more battery packs.

When the same types of three or more battery packs are connected to each other, the SOC of each battery pack may be measured to determine a minimum SOC and a maximum SOC and may be adjusted so that a difference between the minimum SOC and the maximum SOC has a certain threshold value. Since SOCs of the battery packs, by which lifetimes of the battery packs are minimized, are identical regardless of the number of battery packs, the SOCs of the battery packs may be adjusted so that the battery packs operate in a range that is as distant from an SOC of a certain section as possible.

Figure 4:
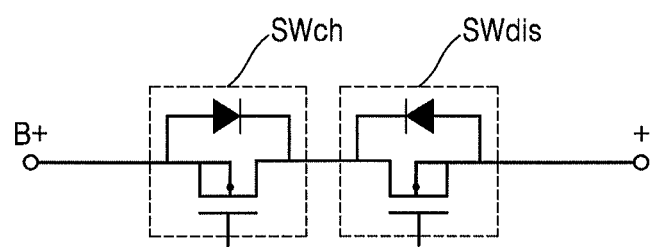
FIG. 4 illustrates an embodiment of a charge and discharge switch.

FIG. 4 illustrates an embodiment of a charge and discharge switch, which is a switch for selectively charging or discharging battery packs. This switch may perform a switching operation between an external charge terminal and each battery pack, e.g., as shown in FIG. 1. The first switch SW1 illustrated in FIG. 1 may be connected between the first battery pack 110 and the external charge terminal. The second switch SW2 illustrated in FIG. 1 may be connected between the second battery pack 120 and the external charge terminal.

Each of the first and second switches SW1 and SW2 may include a charge switch SWch and a discharge switch SWdis, as illustrated in FIG. 4. The battery charge and discharge control system 100 charges or discharges a battery pack according to one or more conditions, e.g., an SOC (e.g., a first reference value) minimizing the lifetime of the battery pack, a current SOC of the battery pack, and/or a first threshold value. Accordingly, the first switch SW1 and the second switch SW2 may have a structure for selectively charging or discharging a battery pack, as illustrated in FIG. 4.

Figure 5A:
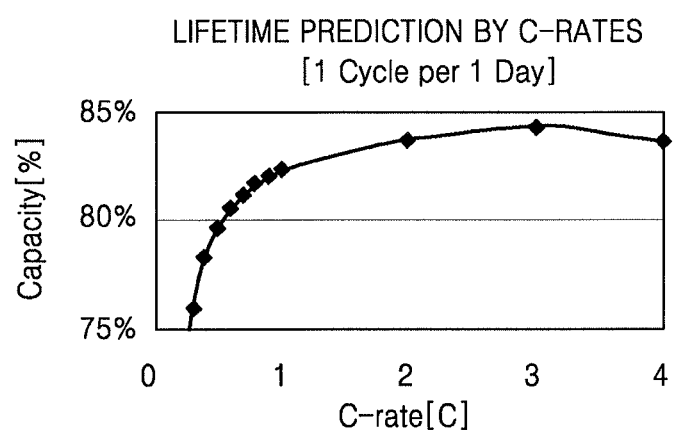

FIGS. 5A and 5B illustrate examples of the remaining capacity of a battery pack according to C-rate, e.g., the remaining capacity measured while the C-rate is varied under a condition where constant energy is charged or discharged by charging and discharging the battery pack once a day. The types of batteries used to measure the C-rate in FIGS. 5A and 5B are different from each other.

When the C-rate is 1C, one hour is required to charge the battery pack from a full discharge state to a full charge state, and one hour is also required to discharge the battery pack from a full charge state to a full discharge state. In addition, due to the condition of charging and discharging the battery pack once a day, the battery pack is in a rest state during 22 hours, except for the two hours for charging and discharging.

Referring to FIG. 5A, in the case of charging and discharging the battery pack with a C-rate of 3C, 20 minutes are required for charging and discharging and a charging or discharging operation does not occur for 23 hours and 20 minutes. In the battery used for the measurement in FIG. 5A, the largest remaining capacity is measured when the battery is charged and discharged with a C-rate of 3C. Thus, the lifetime of the battery may be longest at this time.

In the battery used for the measurement in FIG. 5B, the largest remaining capacity is measured when the battery is charged and discharged with a C-rate of 1C. Thus, the lifetime of the battery may be longest at this time.

Referring to FIGS. 5A and 5B, it is possible to select a certain C-rate that is most advantageous to the lifetime of a battery, and the remaining capacity of the battery may be increased by charging and discharging the battery with the selected C-rate. Since the remaining capacity is a factor that has an influence on the deterioration and lifetime of a battery, a C-rate may be selected that is based on (e.g., advantageous in terms of) deterioration, lifetime, capacity, and/or characteristics of a battery to be used.

Figure 6A:
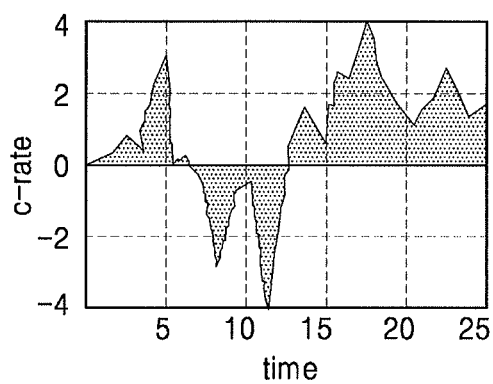
FIG. 6A illustrates a continuous charge and discharge operation performed by one proposed method.
Figure 6B:
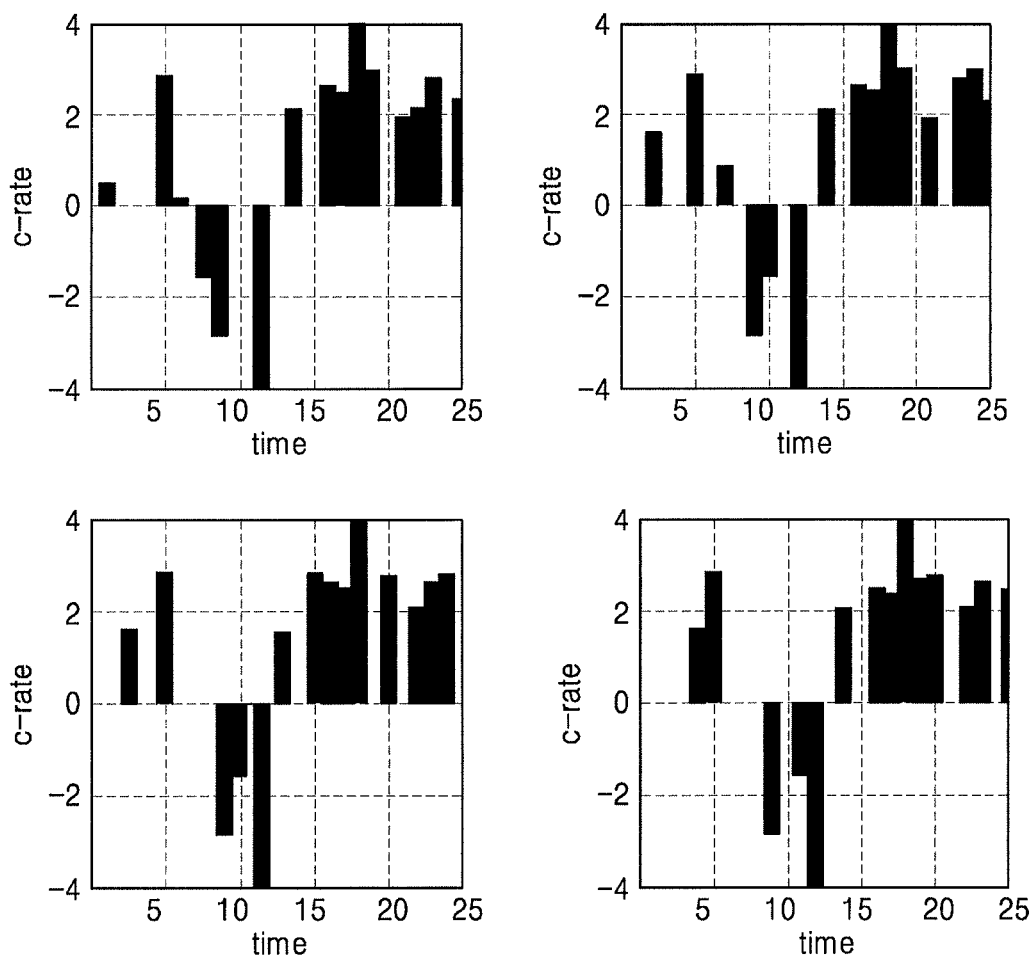
FIG. 6B illustrates a continuous charge and discharge operation according to one embodiment.

FIG. 6A illustrates a continuous charge and discharge according to a comparative example, and FIG. 6B illustrates a continuous charge and discharge according to one embodiment. Continuous charge and discharge may correspond to a system using a plurality of batteries, like an energy storage apparatus, where continuous charging or discharging currents having the same pattern are applied to all of the plurality of batteries when charging or discharging the batteries (or battery packs).

The charging and discharging method corresponding to the comparative example may cause a problem where the degradation of a battery is accelerated when a high-rate charging current is applied to the battery to improve charging speed.

Unlike the comparative example, the continuous charge and discharge performed in FIG. 6B uses a pulse charge and discharge and may be illustrated by four pulse graphs as obtained by dividing the graph of FIG. 6A. The four graphs of FIG. 6B show results obtained when charging and discharging four battery packs. When it is assumed that the graph on the upper left side is a graph for a first battery pack, the graph on the upper right side is a graph for a second battery pack, the graph on the lower right side is a graph for a third battery pack, and the graph on the lower left side is a graph for a fourth battery pack, a charging current or a discharging current that is discontinuous according to time is applied to the first through fourth battery packs.

Referring to the four graphs of FIG. 6B, the C-rate does not exceed 4C during a pulse charge and discharge. Thus, it may be understood that a range of the C-rate was set so as to reduce or minimize deterioration of batteries according to characteristics of the first through fourth battery packs.

As described with reference to FIG. 5, deterioration characteristics of a battery may vary according to the size of the C-rate, which therefore may adversely influence the lifetime of the battery. Accordingly, the C-rate may be determined to be in a range that does not have an adverse influence on the deterioration characteristics of the battery and a battery pack may be charged and discharged with the C-rate in this range.

The charge and discharge controller 140 may charge or discharge the second battery pack during a pulse-off time of a pulse charge and discharge operation of the first battery pack. This is for giving a rest time to a battery pack, and a deterioration speed of the battery pack may be lowered by giving the rest time to the battery pack.

Alternatively, as illustrated in FIG. 6B, the charge and discharge controller 140 may charge or discharge the fourth battery pack during a pulse-off time of a pulse charge and discharge operation of the first through third battery packs while pulse-charging and discharging the first through fourth battery packs.

The number of battery packs, presented in the current specification, is only an example and may be flexibly adjusted according to an output capacity for a system and the size of an output voltage for the system.

Figure 7:
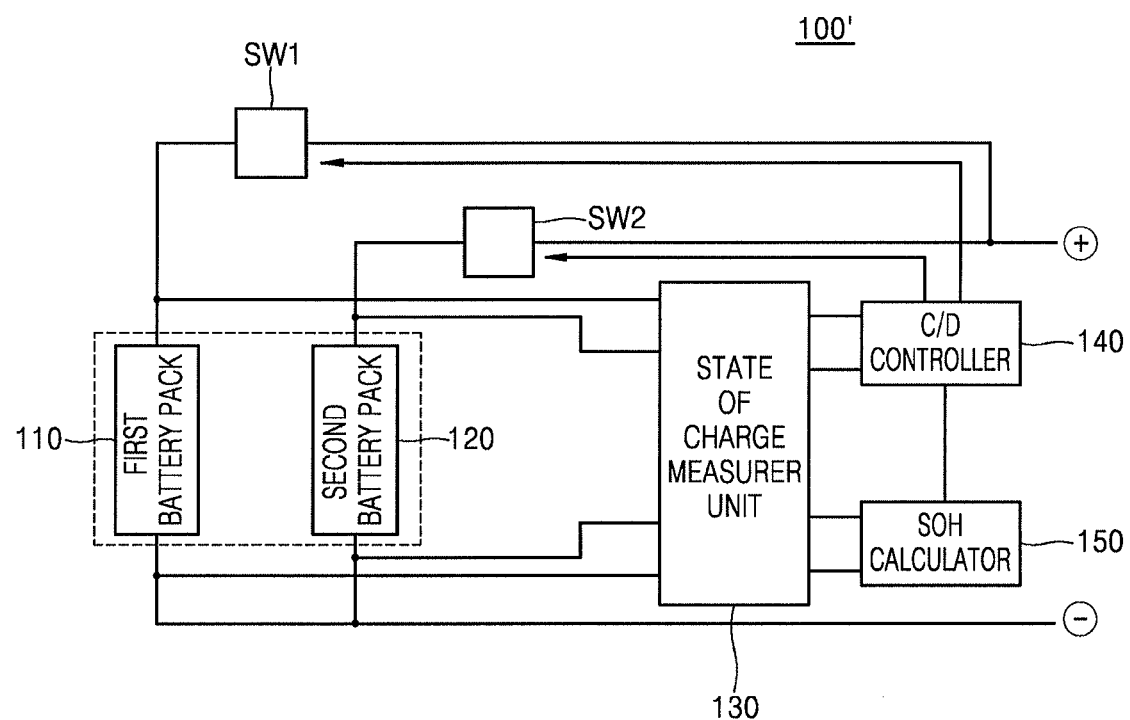
FIG. 7 illustrates another embodiment of a battery charge and discharge control system.

FIG. 7 illustrates another embodiment of a battery charge and discharge control system 100' which includes a first battery pack 110, a second battery pack 120, an SOC measuring unit 130, a charge and discharge controller 140, and a state-of-health (SOH) calculator 150. The first battery pack 110, the second battery pack 120, the SOC measuring unit 130, and the charge and discharge controller 140 in FIG. 7 may be substantially the same as those in FIG. 1.

The SOH calculator 150 calculates a SOH of each of the first and second battery packs 110 and 120. The SOH may correspond to a performance index obtained, for example, by comparing an ideal state of a battery with a current state of the battery. SOH may be indicated in terms of a percentage (%), with an SOH of 100% denoting that the current state of a battery exactly satisfies one or more initial specifications of the battery. The SOH may be calculated in various ways. Examples include calculating SOH based on an internal resistance, impedance, capacity, voltages, and the number of charge and discharge operations of a battery.

The SOH calculator 150 may periodically calculate the SOH of each of the first and second battery packs 110 and 120. When the SOHs of the first and second battery packs 110 and 120 are calculated by the SOH calculator 150, the charge and discharge controller 140 may adjust the SOHs of the first and second battery packs 110 and 120 according to the calculated SOHs. In one embodiment, the charge and discharge controller 140 may adjust the SOHs of the first and second battery packs 110 and 120 only when an SOH difference between the first battery pack 110 and the second battery pack 120 is equal to or greater than a third threshold value.

When the result of the SOH calculator 150 satisfies an SOC adjustment condition, the charge and discharge controller 140 adjusts the SOC of a battery pack. For example, when the SOCs of the first and second battery packs 110 and 120 are set to 40% and 60%, respectively, by adjustment of the charge and discharge controller 140 and lifetime characteristics of batteries are relatively better at SOC 40%, the SOH of the second battery pack 120 is lower than that of the first battery pack 120.

In this case, in order to prevent the second battery pack 120 from rapidly deteriorating compared to the first battery pack 110, the charge and discharge controller 140 may adjust the SOCs of the first and second battery packs 110 and 120 so that, for example, the SOC of the first battery pack 110 is 60% and the SOC of the second battery pack 120 is 40%. In addition, deterioration priorities may be given to a plurality of battery packs, and the SOC of the battery pack may be adjusted only when the SOH of a battery pack having a relatively high priority is low.

Figure 8:
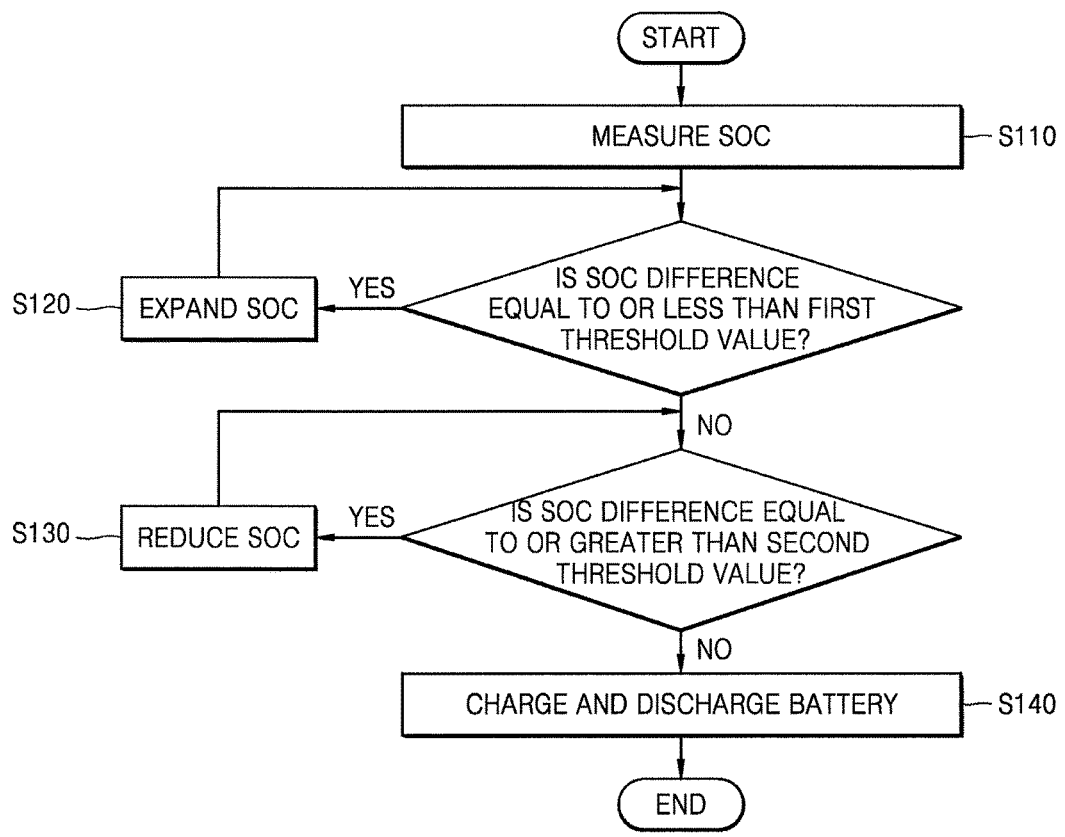
FIG. 8 illustrates an embodiment of a battery charge and discharge control method.

FIG. 8 illustrates another embodiment of a battery charge and discharge control method for controlling charge and discharge operations of first and second battery packs which are connected in parallel. Referring to FIG. 8, the method includes an SOC measuring operation S110, an SOC expanding operation S120, an SOC reducing operation S130, and a battery charging and discharging operation S140.

In operation S110, charge states of the first and second battery packs are measured.

In operation S120, if an SOC difference between the first battery pack and the second battery pack is equal to or less than a first threshold value, SOCs of the first and second battery packs are adjusted so that the SOC difference between the first battery pack and the second battery pack equals the first threshold value.

In operation S130, if an SOC difference between the first battery pack and the second battery pack is equal to or greater than a second threshold value, the SOCs of the first and second battery packs are adjusted so that the SOC difference between the first battery pack and the second battery pack equals the second threshold value.

In operation S140, the first and second battery packs are pulse-charged with a first C-rate.

In the SOC expanding operation S120 and the SOC reducing operation S130, the SOCs of the first and second battery packs may be adjusted, for example, so that an average of the SOCs of the first and second battery packs before the adjustment is equal to an average of the SOCs of the first and second battery packs after the adjustment. Thus, when increasing the SOC first battery pack, the SOC of the other battery pack is increased based on the amount of SOC increase of the first battery pack, or vice versa.

In addition, in the SOC expanding operation S120, the SOCs of the first and second battery packs may be adjusted so that the sum of a difference between the SOC of the first battery pack after the adjustment and a first reference value and a difference between the SOC of the second battery pack after the adjustment and the first reference value is increased or maximized. In this case, the first reference value may be an SOC value for reducing or minimizing lifetimes of the first and second battery packs.

For example, when an SOC which minimizes lifetimes of the first and second battery packs is 50%, the first reference value may be 50%. In the SOC expanding operation S120, the SOC of the first battery pack and the SOC of the second battery pack may be adjusted to be different or distant from 50%. However, the SOCs of the first and second battery packs may be adjusted within a range, in which the average of the SOCs of the first and second battery packs after the adjustment is equal to the average of the SOCs of the first and second battery packs before the adjustment, and an SOC range, in which an SOC difference between the first battery pack and the second battery pack is equal to the first threshold value.

In the SOC expanding operation S120 or the SOC reducing operation S130, the SOCs of the first and second battery packs 110 and 120 may not be adjusted when the SOCs of the first and second battery packs are equal to or less than 10% or equal to or greater than 90% before adjusting the SOCs. Accordingly, even if the SOC difference between the first battery pack and the second battery pack is equal to or less than the first threshold value or is equal to or greater than the second threshold value, the SOCs of the first and second battery packs are not adjusted when the SOC of one of the first or second battery packs is equal to or less than 10% or is equal to or greater than 90%.

In one embodiment, the range, in which the SOC of one of the first or second battery packs may not be adjusted, may be changed, for example, based on the number of batteries connected in parallel.

The first C-rate in the battery charging and discharging operation S140 may be set based on a C-rate value for which the lifetimes of the first and second battery packs are increased or maximized. As described with reference to FIG. 5A, in a battery pack having best lifetime characteristics when the first C-rate is 3C, the first C-rate may be set to a value equal to or less than 4C or is close to 3C.

In the battery charging and discharging operation S140, a rest time may be given to each battery pack by charging and discharging the second battery pack during a pulse-off time of a pulse charge and discharge operation of the first battery pack. Lifetime characteristics of each battery pack may be improved by giving the rest time to each battery pack.

Figure 9:
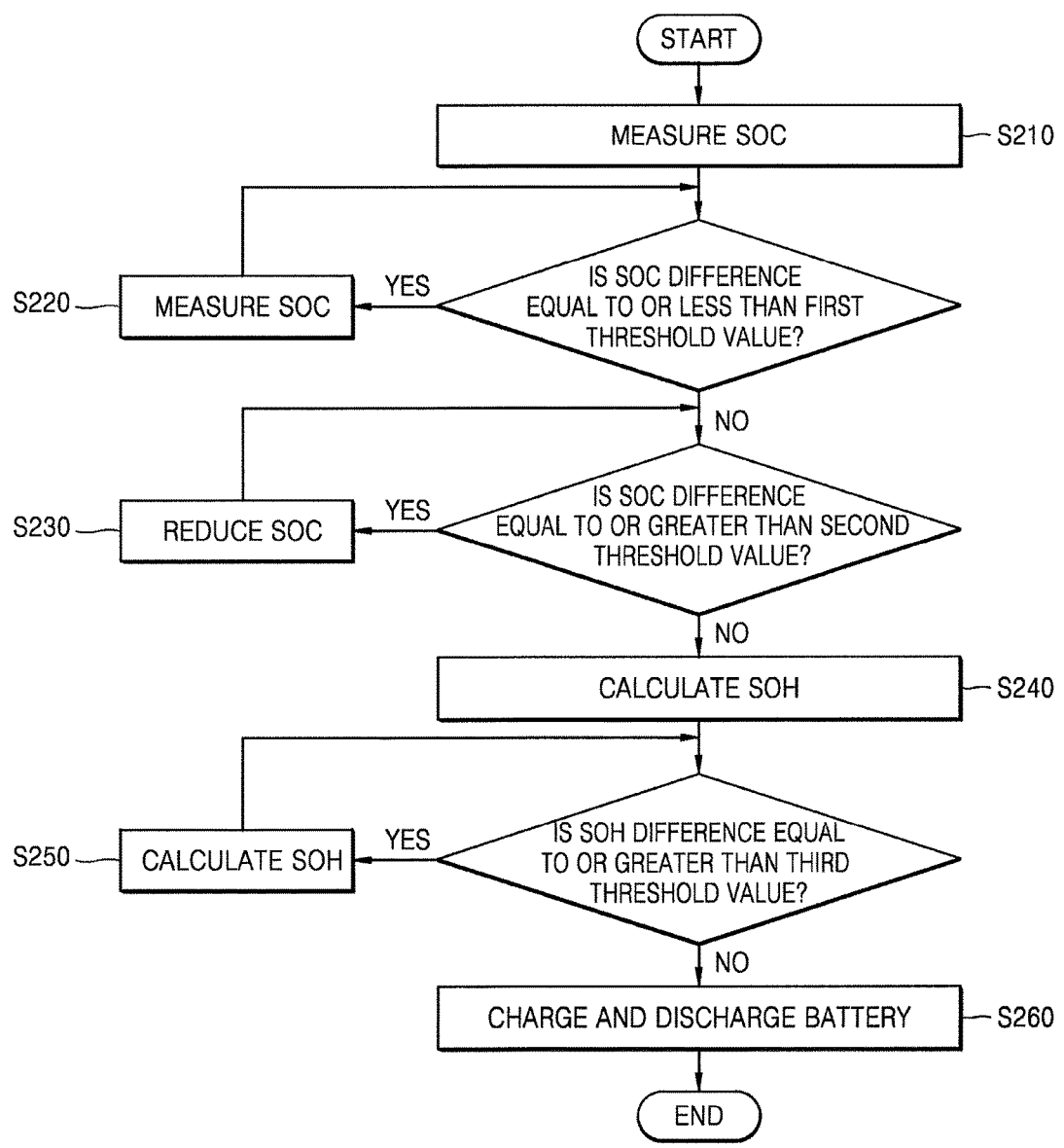
FIG. 9 illustrates another embodiment of a battery charge and discharge control method.

FIG. 9 illustrates another embodiment of a battery charge and discharge control method which includes an SOC measuring operation S210, an SOC expanding operation S220, an SOC reducing operation S230, an SOH calculating operation S240, and a battery charging and discharging operation S250. The SOC measuring operation S210, the SOC expanding operation S220, the SOC reducing operation S230, and the battery charging and discharging operation S250 may be substantially the same as the SOC measuring operation S110, the SOC expanding operation S120, the SOC reducing operation S130, and the battery charging and discharging operation S140 in FIG. 8.

In operation S240, SOHs of the first and second battery packs are calculated.

In operation S250, the SOCs of the first and second battery packs may be adjusted based on the SOHs of the first and second battery packs, calculated in operation S240. The SOH may be used as an index for determining a current lifetime state of a battery. When the SOH is high, the current state of the battery may be most similar to a state before the battery is used. Accordingly, it may be understood that, when the SOH is low, the battery further deteriorated.

As described above with reference to FIG. 2, there may be a certain SOC section that has an adverse influence on the remaining capacity of a battery or the lifetime of the battery according to the type of battery. Thus, the SOC of a battery pack having a low SOH may be adjusted so that the battery pack operates in an SOC section other than an SOC section in which the battery pack currently operates.

For example, when the SOCs of the first and second battery packs are set to 40% and 60%, respectively, by the adjustment in operation S220 or operation S230, and lifetime characteristics of batteries are relatively better at SOC 40%, the SOH of the second battery pack is lower than that of the first battery pack. In this case, in order to prevent the second battery pack from rapidly deteriorating, compared to the first battery pack, the SOC of the first battery pack and the SOC of the second battery pack may be adjusted to 60% and 40%, respectively, in operation S250.

In addition, in one embodiment, deterioration priorities may be given to a plurality of battery packs, and the SOC of the battery pack may be adjusted only when an SOH of a battery pack having a relatively high priority is low.

In accordance with another embodiment, an apparatus includes an interface and a controller to generate signals for output through the interface. The signals adjust a state-of-health (SOC) of each of a first battery pack and a second battery pack. When a difference between the SOCs of the first and second battery packs is less than a first threshold value, the controller is to adjust the SOCs of the first and second battery packs so that the difference between the SOC of the first and second battery packs is equal to the first threshold value, an average of the SOCs of the first and second battery packs before the adjustment is equal to an average of the SOCs of the first and second battery packs after the adjustment.

The interface may be may take various forms. For example, when the controller (e.g., controller 140) is embodied within an integrated circuit chip, the interface may be one or more output terminals, leads, wires, ports, signal lines, or other type of interface without or coupled to the controller.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The controllers, adjusters, measurers, and other processing features of the embodiments disclosed herein may be implemented in logic which, for example, may include hardware, software, or both. When implemented at least partially in hardware, the controllers, adjusters, measurers, and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, adjusters, measurers, and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments described herein.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A battery charge and discharge control system, comprising:
   a first battery pack and a second battery pack connected in parallel;
   a state-of-charge (SOC) measuring unit configured to measure SOC of the first battery pack and SOC of the second battery pack; and
   a controller configured to adjust the SOC of the first battery pack and the SOC of the second battery pack, wherein, when a difference between the SOC of the first battery pack and the SOC of the second battery pack is less than a first threshold value, the controller is configured to perform an adjustment to adjust the SOC of the first battery pack and the SOC of the second battery pack so that the difference becomes equal to the first threshold value, and an average of the SOC of the first battery pack and the SOC of the second battery pack is unchanged before and after the adjustment, wherein the controller pulse-charges or pulse-discharges the first battery pack and the second battery pack using a first C-rate.

2. The battery charge and discharge control system according to claim 1, wherein the controller is further configured to:
adjust the SOC of the first battery pack and the SOC of the second battery pack so that a sum of a difference between the SOC of the first battery pack after the adjustment and a first reference value and a difference between the SOC of the second battery pack after the adjustment and the first reference value is increased, wherein the first reference value corresponds to an SOC value for reducing lifetime of the first battery pack and lifetime of the second battery pack.

3. The battery charge and discharge control system according to claim 1, wherein:
when the SOC of the first battery pack and the SOC of the second battery pack are equal to or less than 10% or equal to or greater than 90% before adjusting the SOC of the first battery pack and the SOC of the second battery pack, the controller does not adjust the SOC of the first battery pack and the SOC of the second battery pack.

4. The battery charge and discharge control system according to claim 1, wherein the controller is configured to charge or discharge the second battery pack during a pulse-off time of a pulse charge and discharge operation of the first battery pack.

5. The battery charge and discharge control system according to claim 1, wherein:
when the difference between the SOC of the first battery pack and the SOC of the second battery pack is greater than a second threshold value, the controller charges or discharges the first battery pack and the second battery pack so that the difference between the SOC of the first battery pack and the SOC of the second battery pack is equal to the second threshold value.

6. The battery charge and discharge control system according to claim 1, further comprising:
a state-of-health (SOH) calculator to calculate SOH of the first battery pack and SOH of the second battery pack, wherein the controller adjusts the SOC of the first battery pack and the SOC of the second battery pack based on an SOH calculated by the SOH calculator.

7. The battery charge and discharge control system according to claim 6, wherein the controller adjusts the SOC of the first battery pack and the SOC of the second battery pack when a difference between the SOH of the first battery pack and the SOH of the second battery pack is equal to or greater than a third threshold value.

8. The battery charge and discharge control system according to claim 1, further comprising:
a first switch to be turned on or turned off based on a first control signal, which is received from the controller, to charge or discharge the first battery pack; and
a second switch to be turned on or turned off based on a second control signal, which is received from the controller, to charge or discharge the second battery pack.

9. A method for controlling a first battery pack and a second battery pack connected in parallel, the method comprising:
(a) measuring charge state of charge (SOC) of the first battery pack and SOC of the second battery pack;
(b) adjusting the SOC of the first battery pack and the SOC of the second battery pack when a difference between the SOC of the first battery pack and the SOC of the second battery pack is less than a first threshold value so that the difference becomes equal to the first threshold value;
(c) adjusting the SOC of the first battery pack and the SOC of the second battery pack when the difference between the SOC of the first battery pack and the SOC of the second battery pack is greater than a second threshold value so that the difference becomes equal to the second threshold value; and
(d) pulse-charging the first battery pack and the second battery pack using a first C-rate.

10. The method according to claim 9, wherein at least one of (b) or (c) includes: performing an adjustment of adjusting the SOC of the first battery pack and the SOC of the second battery pack so that an average of the SOC of the first battery pack and the SOC of the second battery pack is unchanged before and after the adjustment.

11. The method according to claim 9, wherein (b) includes:
performing an adjustment of adjusting the SOC of the first battery pack and the SOC of the second battery pack so that a sum of a difference between a first reference value and the SOC of the first battery pack after the adjustment and a difference between the first reference value and the SOC of the second battery pack after the adjustment is increased or maximized, the first reference value corresponding to an SOC value for reducing or minimizing lifetime of the first battery pack and lifetime of the second battery pack.

12. The method according to claim 9, further comprising:
the SOC of the first battery pack and the SOC of the second battery pack are not adjusted when the SOC of the first battery pack and the SOC of the second battery pack are equal to or less than 10% or equal to or greater than 90% before adjusting the SOC of the first battery pack and the SOC of the second battery pack.

13. The method according to claim 9, further comprising:
charging the second battery pack during a pulse-off time of a pulse charge operation of the first battery pack.

14. The method according to claim 9, further comprising:
calculating a state of health (SOH) of the first battery pack and a SOH of the second battery pack, and
adjusting the SOC of the first battery pack and the SOC of the second battery pack according to the SOH of the first battery pack and the SOH of the second battery pack.

15. The method according to claim 14, further comprising:
adjusting the SOC of the first battery pack and the SOC of the second battery pack when a difference between the SOH of the first battery pack and the SOH of the second battery pack is equal to or greater than a third threshold value.

16. An apparatus, comprising:
an interface; and
a controller configured to generate signals for output through the interface, the signals to perform an adjustment to adjust a state-of-charge (SOC) of each of a first battery pack and a second battery pack, wherein:

when a difference between the SOC of the first battery pack and the SOC of the second battery pack is less than a first threshold value, the controller adjusts the SOC of the first battery pack and the SOC of the second battery pack so that the difference is equal to the first threshold value, an average of the SOC of the first battery pack and the SOC of the second battery pack is unchanged before and after the adjustment.

17. The apparatus according to claim 16, wherein the controller is configured to pulse-charge or pulse-discharge the first battery pack and the second battery pack based on a predetermined C-rate.

18. The apparatus according to claim 16, wherein the controller is configured to:

adjust the SOC of the first battery pack and the SOC of the second battery pack so that a sum of a difference between a first reference value and the SOC of the first battery pack after the adjustment and a difference between the first reference value and the SOC of the second battery pack after the adjustment is increased, wherein the first reference value corresponds to an SOC value for reducing lifetime of the first battery pack and lifetime of the second battery pack.

19. The apparatus according to claim 16, wherein:

when the SOC of the first battery pack and the SOC of the second battery pack are equal to or less than a first value or equal to or greater than a second value greater than the first value before the SOC of the first battery pack and the SOC of the second battery pack are adjusted, the controller does not adjust the SOC of the first battery pack and the SOC of the second battery pack.

20. The apparatus according to claim 16, wherein the controller is configured to charge or discharge the second battery pack during a pulse-off time of a pulse charge and discharge operation of the first battery pack.

* * * * *